(12) United States Patent
Chen et al.

(10) Patent No.: US 10,783,211 B2
(45) Date of Patent: Sep. 22, 2020

(54) PAGE PROCESSING METHOD AND DEVICE THEREOF

(71) Applicant: WANGSU SCIENCE & TECHNOLOGY CO., LTD., Shanghai (CN)

(72) Inventors: Yunhui Chen, Shanghai (CN); Qingfeng Xie, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 261 days.

(21) Appl. No.: 15/570,901

(22) PCT Filed: Feb. 7, 2017

(86) PCT No.: PCT/CN2017/073017
§ 371 (c)(1),
(2) Date: Oct. 31, 2017

(87) PCT Pub. No.: WO2018/129774
PCT Pub. Date: Jul. 19, 2018

(65) Prior Publication Data
US 2019/0050493 A1    Feb. 14, 2019

(30) Foreign Application Priority Data

Jan. 16, 2017    (CN) .......................... 2017 1 0030437

(51) Int. Cl.
*G06F 16/957* (2019.01)
*H04L 29/08* (2006.01)
(Continued)

(52) U.S. Cl.
CPC ........ *G06F 16/9574* (2019.01); *G06F 16/955* (2019.01); *G06F 16/972* (2019.01);
(Continued)

(58) Field of Classification Search
CPC .. G06F 16/9574; G06F 16/972; G06F 16/958; G06F 16/957; G06F 16/9577; G06F 16/212; G06F 8/34; H04L 67/34
See application file for complete search history.

(56) References Cited

U.S. PATENT DOCUMENTS

2005/0108418 A1    5/2005  Bedi et al.
2009/0248831 A1*  10/2009  Scott ....................... G06T 11/60
                                                                 709/217
(Continued)

FOREIGN PATENT DOCUMENTS

CN    101170763 A    4/2008
CN    102591943 A    7/2012
(Continued)

OTHER PUBLICATIONS

The European Patent Office (EPO) The Extended European Search Report for 17844614.2 Jul. 31, 2018 11 Pages.
(Continued)

*Primary Examiner* — Barbara B Anyan
(74) *Attorney, Agent, or Firm* — Anova Law Group, PLLC

(57) ABSTRACT

The present disclosure provides a page processing method and device thereof. In particular, the method comprises: receiving a first command, where the first command is configured to instruct and visit a first page and, the first page is a page visited on a terminal; reading a cached resource of the first page from a terminal memory; based on the cached resource of the first page, re-loading the first page; and displaying the re-loaded first page on the terminal. The present disclosure solves the technical issue of a low processing speed when a backward operation is executed in the page.

14 Claims, 5 Drawing Sheets

(51) Int. Cl.
    *G06F 16/958*     (2019.01)
    *G06F 16/955*     (2019.01)
    *G06T 11/60*     (2006.01)

(52) U.S. Cl.
    CPC .......... *H04L 67/02* (2013.01); *H04L 67/2842* (2013.01); *H04L 67/2857* (2013.01); *G06T 11/60* (2013.01)

(56) References Cited

U.S. PATENT DOCUMENTS

| | | | |
|---|---|---|---|
| 2012/0062940 A1* | 3/2012 | Masutani | G06T 11/60 358/1.15 |
| 2012/0079365 A1* | 3/2012 | Yoshida | G06F 16/9574 715/234 |
| 2013/0067170 A1 | 3/2013 | Lam | |
| 2013/0239180 A1* | 9/2013 | Weller | G06F 16/972 726/4 |
| 2013/0311274 A1* | 11/2013 | Ashok | G06Q 30/02 705/14.49 |
| 2014/0215310 A1* | 7/2014 | Kim | G06F 3/04883 715/234 |
| 2014/0280691 A1* | 9/2014 | Buerner | H04L 67/02 709/217 |
| 2015/0074224 A1* | 3/2015 | Kleinhout | H04L 67/02 709/217 |
| 2015/0143224 A1* | 5/2015 | Kennedy | G06F 17/2247 715/234 |
| 2019/0018902 A1* | 1/2019 | Xie | G06F 16/955 |

FOREIGN PATENT DOCUMENTS

| | | |
|---|---|---|
| CN | 103699595 A | 4/2014 |
| CN | 104239302 A | 12/2014 |
| CN | 104765622 A | 7/2015 |
| CN | 105989012 A | 10/2016 |

OTHER PUBLICATIONS

Jan P Posma Maintaining scroll positions in all browsers Dec. 14, 2015 Retrieved from the Internet on Jul. 17, 2018 https://brigade.engineering/maintaining-scroll-positions-in-副 | -browsers-a280d49bffca.

\* cited by examiner

PAGE PROCESSING METHOD AND DEVICE THEREOF

CROSS-REFERENCES TO RELATED APPLICATIONS

This application is a national stage patent application of PCT application No. PCT/CN2017/073017, filed on Feb. 7, 2017, which claims priority to Chinese Patent Application No. 201710030437.3, filed on Jan. 16, 2017, the entire content of all of which is incorporated herein by reference.

FIELD OF THE DISCLOSURE

The present disclosure relates to the field of mobile communication and, more particularly, relates to a page processing method and device thereof.

BACKGROUND

As the popularity of the internet grows, the users of mobile browser increase, and the usage scenarios of the browser increase. Further, the usage frequency of the mobile browser as the most common access of the mobile internet becomes higher and higher. However, in existing technologies, when the user browses a page in the browser based on the CrossWalk core, if the user executes a backward operation in the current page, the previous page may be re-loaded. That is, the main resource of the previous webpage needs to be re-resolved. Such processing method wastes data traffic and affects the browsing speed, and the re-loaded previous page each time always returns to the front of the page, such that the user needs to manually slide back to the position where the webpage is previously left, which severely affects the user experience.

Directed to addressing the aforementioned issue regarding a low processing speed of executing the backward operation in a page, no effective solution has been put forward by the browser based on the CrossWalk core.

BRIEF SUMMARY OF THE DISCLOSURE

Embodiments of the present disclosure provide a page processing method and device thereof, thereby at least solving the technical issue of a low processing speed when a backward operation is executed in the page.

According to one aspect of the present disclosure, a page processing method is provided, comprising: receiving a first command, where the first command is configured to instruct and visit a first page, and the first page is a page that has been visited on a terminal; reading a cached resource of the first page from a terminal memory; based on the cached resource of the first page, re-loading the first page; and displaying the re-loaded first page on the terminal.

Further, before receiving the first command, the method further comprises: after receiving a access request to visit the first page for a first time, acquiring the cached resource of the first page from a server; performing loading and resolving operations on the cached resource of the first page, thereby displaying the first page on the terminal; after displaying the first page on the terminal, receiving a second command, where the second command is configured to instruct and visit a second page; and in response to the second command, storing the cached resource of the first page in the terminal memory.

Further, storing the cached resource of the first page in the terminal memory comprises: after suspending a loading task of the first page, acquiring the cached resource of the first page and a network resource address of the first page; and storing a correlation relationship between the cached resource of the first page and the network resource address of the first page in the terminal memory.

Further, the first command includes a forward command and a backward command. In particular, the forward command is configured to instruct a currently displayed page to be switched to a next page, where the next page is the first page, and the backward command is configured to instruct the currently displayed page to be switched to a previous page, where the previous page is the first page.

Further, the cached resource of the first page includes: a focus location of the first page and dimension information of the first page. In particular, re-loading the first page based on the cached resource of the first page comprises: re-loading the first page based on the dimension information and a currently displayed frame, where the currently displayed frame is determined based on a display interface of the terminal; and displaying the re-loaded first page on the terminal comprises: displaying content corresponding to the focus location of the first page on the terminal.

Further, the cached resource of the first page includes at least one of the following: a page display frame of the terminal, page content of the first page, page layout information of the first page, frame view information of the first page, document content already loaded in the first page, and a focus location of the first page, where the focus location represents a page browsing location when the first page is last visited via the terminal.

Further, the disclosed method is applied to a browser that uses an open-source page engine.

According to another aspect of the present disclosure, a page processing device is further provided, comprising: a receiving unit configured to receive a first command, where the first command is configured to instruct and visit a first page, and the first page is a page that has been visited on the terminal; a reading unit configured to read a cached resource of the first page stored at a terminal memory; a loading unit configured to re-load the first page based on the cached resource of the first page; and a displaying unit configured to display the re-loaded first page on the terminal.

Further, before receiving the first command, the device further comprises: a first acquiring module configured to, after receiving a access request to visit the first page for a first time, acquire the cached resource of the first page from a server; a displaying module configured to perform loading and resolving operations on the cached resource of the first page, thereby displaying the first page on the terminal; a receiving module configured to, after displaying the first page on the terminal, receive a second command, where the second command is configured to instruct and visit a second page; and a responding module configured to respond to the second command, and store the cached resource of the first page in the terminal memory.

Further, the responding module comprises: a second acquiring module configured to, after suspending a loading task of the first page, acquire the cached resource of the first page and a network resource address of the first page; a first storing module configured to store a correlation relationship between the cached resource of the first page and a network resource address of the first page in the terminal memory.

Further, the first command includes a forward command and a backward command. In particular, the forward command is configured to instruct a currently displayed page to be switched to a next page, where the next page is the first page, and the backward command is configured to instruct the currently displayed page to be switched to a previous page, where the previous page is the first page.

Further, the cached resource of the first page includes: a focus location of the first page and dimension information of the first page. In particular, the loading unit is configured to re-load the first page based on the dimension information and a currently displayed frame, where the currently displayed frame is determined based on a display interface of the terminal; and the display unit is configured to display content corresponding to the focus location of the first page on the terminal.

Further, the cached resource of the first page includes at least one of the following: a page display frame of the terminal, page content of the first page, page layout information of the first page, frame view information of the first page, document content already loaded in the first page, and a focus location of the first page, where the focus location represents a page browsing location when the first page is last visited via the terminal.

Further, the disclosed device is applied to a browser that uses an open-source page engine.

In embodiments of the present disclosure, a terminal receives a first command and re-visits a first page that the terminal has already visited under instruction of the first command, where after visiting the first page for a first time and under a situation where the first page jumps to other pages, the terminal stores the cached resource of the first page in the terminal memory. Accordingly, when the terminal once again visits the first page, the terminal may directly read the cached resource of the first page from the terminal memory. Further, the terminal may re-load the first page based on the obtained cached resource of the first page, and display the re-loaded first page on the terminal. Thus, under situations where the terminal receives a command configured to instruct the terminal to once again visit a page that the terminal has already visited, the webpage no longer needs to be loaded and resolved from the network, and the entire cached resource of such webpage may be read directly from the terminal memory. Thus, not only the data traffic consumption is saved, but the re-visit of the already visited page may be realized rapidly, thereby solving the technical issue of a low processing speed when a backward operation is executed in the page.

BRIEF DESCRIPTION OF THE DRAWINGS

The accompanying drawings illustrated herein are configured to provide further understanding of the present disclosure, thereby forming a part of the present disclosure. Exemplary embodiments of the present disclosure and illustrations thereof are used to illustrate the present disclosure, rather than constituting inappropriate limitations on the present disclosure. In the accompanying drawings.

DETAILED DESCRIPTION

To enable those skilled in the relevant art to have a better understanding of solutions in the present disclosure, technical solutions in embodiments of the present disclosure will be described in a clear and complete manner hereinafter with reference to the accompanying drawings in embodiments of the present disclosure. Obviously, the described embodiments are only a part of the embodiments of the present disclosure, but not entire embodiments. Based on the embodiments of the present disclosure, all other embodiments obtainable by those ordinarily skilled in the relevant art without creative work shall all fall within the protection range of the present disclosure.

It should be noted that, terms such as "first" and "second" in the specification, claims and aforementioned accompanying drawings of the present disclosure are used to differentiate similar objects, but not necessarily configured to describe a certain order or a precedence order. It should be understood that data used in such way may be exchanged under appropriate circumstances, such that embodiments of the present disclosure described herein may be implemented in an order other than that illustrated or described herein. Further, terms of "comprising" and "including" and any variation thereof are intended to cover non-exclusive inclusions. For example, a process, method, system, product or device including a series of steps or units may not be limited to those steps or units listed clearly, but may include those not clearly listed or other steps or units intrinsic to such process, method, product, or device.

According to embodiments of the present disclosure, an example of a page processing method is provided. It should be noted that, steps illustrated in flow charts of the accompanying drawings may be executed in a computer system such as a group of computer executable commands. Further, though logic orders are illustrated in the flow chart, under certain situations, steps may be executed in an order other than that illustrated or described herein.

Figure 1:
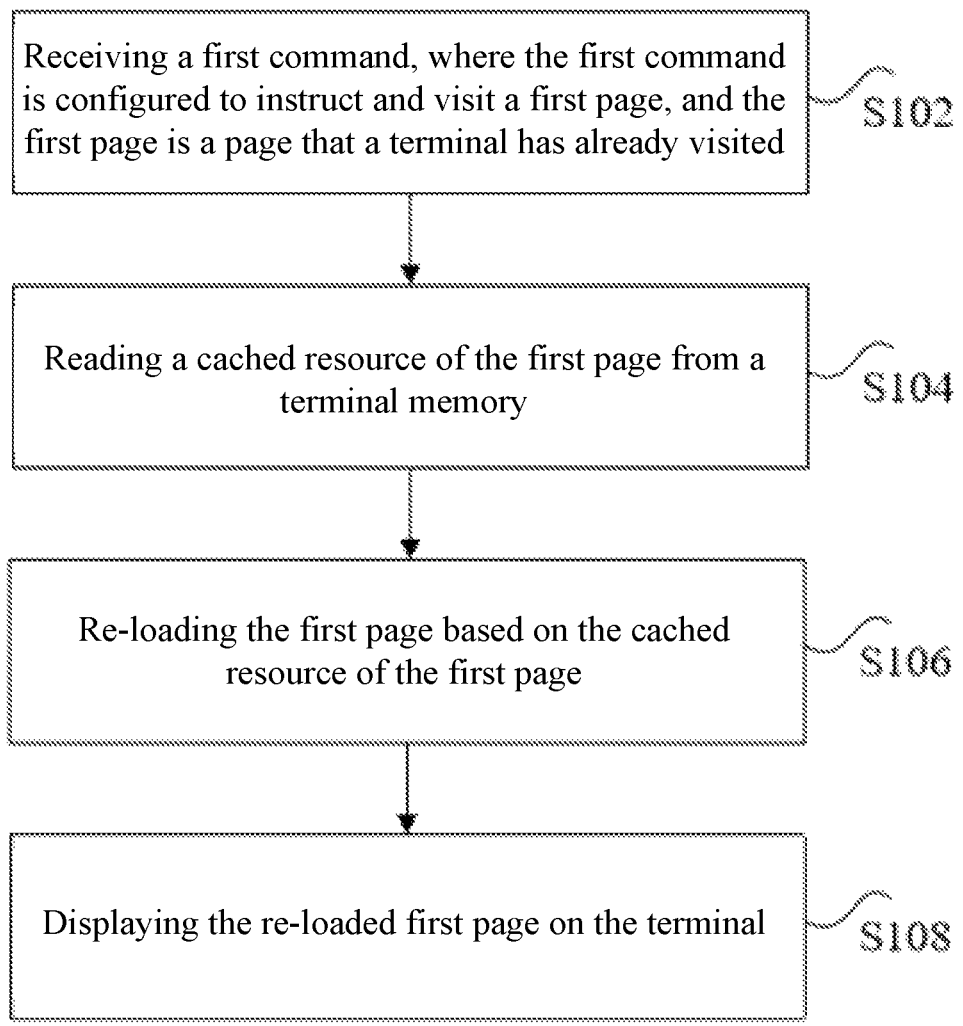
FIG. 1 illustrates a flow chart of a page processing method according to embodiments of the present disclosure.

FIG. 1 illustrates a flow chart of a page processing method according to embodiments of the present disclosure. As shown in FIG. 1, the method comprises the following steps:

Step S102, receiving a first command, where the first command is configured to instruct and visit a first page, and the first page is a page that a terminal has already visited;

Step S104, reading a cached resource of the first page from a terminal memory;

Step S106, re-loading the first page based on the cached resource of the first page; and Step S108, displaying the re-loaded first page on the terminal.

Through the aforementioned steps, the terminal receives a first command and re-visits a first page that the terminal has already visited under instruction of the first command, where after visiting the first page for a first time and under a situation where the first page jumps to other pages, the terminal stores the cached resource of the first page in the terminal memory. Accordingly, when the terminal once again visits the first page, the terminal may directly read the cached resource of the first page from the terminal memory. Further, the terminal may re-load the first page based on the obtained cached resource of the first page, and display the re-loaded first page on the terminal. Thus, under situations where the terminal receives a command configured to once again visit a page that the terminal already visited, the webpage no longer needs to be loaded and resolved from the network, and the entire cached resource of such webpage may be read directly from the terminal memory. Thus, not only the data traffic consumption is saved, but also the re-visit of the already visited page may be realized rapidly, thereby solving the technical issue of a low processing speed when a backward operation is executed in the page.

As an optional embodiment, the terminal memory is a storage space configured in a terminal local cache. The terminal may store entire resources of a page that is visited in the storage space of the local cache, such that under situations where the terminal receives a command to once again visit the page that the terminal has already visited, the terminal may directly read the entire cached resource of the page corresponding to the command from the storage space of the local cache, and re-load and display the page. Thus, the resource of the page to be browsed may no longer need to be downloaded from the network, thereby reducing the browsing flow consumption and expediting a page generation speed.

In an optional embodiment, the cached resource of the first page stored in the terminal memory may use a page cache mechanism named Page Cache, thereby storing the cached resource of the first page in a page cache linked list.

It should be noted that, Page Cache, also known as pcache, has a Chinese name of "页面缓存" and is configured to cache logic content of a document when reading and writing a document. Accordingly, the visit of the data may be expedited, such that the storage and reading of the cached resource of the first page may become faster.

Optionally, the terminal memory for storing the cached resource of the first page may be a double-linked list that is configured to store the cached resource of the first page and read the cached resource of the first page from the linked list.

In the aforementioned embodiments, the terminal may be a mobile device, and under control of the first command, the first page may be displayed on a browser of the mobile device.

Optionally, a browser developed based on the CrossWalk core is installed on the terminal, and embodiments of the present disclosure may display scenarios of the page via the browser installed on the terminal.

As an optional embodiment, before receiving the first command, the method further comprises: after receiving a access request to visit the first page for a first time, acquiring the cached resource of the first page from a server; performing loading and resolving operations on the cached resource of the first page, thereby displaying the first page on the terminal; after displaying the first page on the terminal, receiving a second command, where the second command is configured to instruct and visit a second page; and in response to the second command, storing the cached resource of the first page in the terminal memory.

More specifically, after receiving the access request of the first page for the first time, the terminal receives the cached resource included in the first page from a server of the first page, and performs analyzing and loading operations on the received cached resource, thereby generating a first page corresponding to the received resource and displaying the generated first page on the terminal for a user to browse the first page at the terminal device. Further, after displaying the first page on the terminal, the user may further send a new command to the terminal, thereby allowing the terminal to generate other pages after receiving the command. Thus, the page that the terminal displays after displaying the first page is a second page, and a command to generate the second page is a second command. In particular, before the process where the terminal responds to the second command and generates the second page, the cached resource of the original first page displayed on the terminal may be stored in the terminal memory. Accordingly, under situations where the terminal re-receives the first command to generate the first page, the cached resource of the already received first page may be read from the terminal memory, thereby providing preparation work for generating the first page once again.

In one optional embodiment, storing the cached resource of the first page in the terminal memory comprises: after suspending a loading task of the first page, acquiring the cached resource of the first page and a network resource address of the first page; and storing a correlation relationship between the cached resource of the first page and the network resource address of the first page in the terminal memory.

More specifically, in a process of storing the cached resource of the first page in the terminal memory, an unfulfilled loading task in the first page may be first suspended, and then the cached resource of the first page and the network resource address of the first page may be acquired. Further, the acquired correlation relationship between the cached resource of the first page and the network resource address of the first page may be stored in the page cache linked list, and the page cache linked list is stored at the terminal cache. By storing the cached resource of the first page and the network resource address of the first page in the page cache linked list, the cached resource of the first page may be more conveniently read from the linked list in the subsequent operation processes.

In an optional embodiment, the first command includes a forward command or a backward command. In particular, the forward command is configured to instruct the currently displayed page to be switched to a next page, and the next page is the first page. The backward command is configured to instruct the currently displayed page to be switched to a previous page, and the previous page is the first page.

More specifically, the first command configured to instruct and generate the first page may include the forward command or the backward command. After receiving a series of instructions by the user, the terminal displays a plurality of pages according to an order of the instructions, and during a process of displaying the pages, the terminal sorts the displayed pages based on a precedence order. In particular, the command to instruct the terminal to display pages may be a first command, and the first command may include a forward command or a backward command. When the forward command is received under situations where the terminal displays a current page, the current page displayed at the terminal may be, based on the displayed page precedence order, switched to the next page in the aforementioned page precedence order, and the next page may be used as the first page. When the backward command is received under situations where the terminal displays a current page, the current page displayed at the terminal may be, based on the displayed page precedence order, switched to the previous page in the aforementioned page precedence order, and the previous page may be used as the first page.

As an optional embodiment, reading the cached resource of the stored first page from the terminal memory comprises: reading the cached resource of the first page corresponding to the network resource address of the first page from the terminal memory.

More specifically, the content stored at the terminal content may comprises the cached resource of the first page and the network resource address corresponding to the first page.

During a process of reading the cached resource of the first page from the terminal memory, the network resource address of the first page that needs to be read may be first recognized at the terminal memory, and the cached resource of the first page corresponding to the network resource address of the recognized first page may then be read. Accordingly, by recognizing the network resource address corresponding to the first page at the terminal memory, the cached resource of the first page that needs to be read may be rapidly found out, thus allowing the reading process to become faster.

It should be noted that, the network resource address, i.e., URL, has an English full name of Uniform Resource Locator and a Chinese full name of "统一资源定位符", and is a short expression of acquiring the location and the visit method of the page resource, as well as a page address of a standard resource over the internet. Each page has a unique corresponding URL, and by using a Key-Value pair method, the unique URL of the first page may be used as the Key in the Key-Value pair, and the cached resource of the first page may be stored in a linked list of the Value corresponding to the Key. Accordingly, under situations where the terminal needs to acquire the first page, the cached resource of the first page corresponding to the URL may be read from the linked list based on a corresponding Key-Value pair, such that the first page may be generated based on the cached resource of the page that is read.

In an optional embodiment, storing the cached resource of the first page in the terminal memory comprises: comparing a data capacity of the cached resource of the first page with a free storage capacity of the terminal memory; if the data capacity of the cached resource of the first page is not greater than the free storage capacity of the terminal memory, the cached resource of the first page is directly stored in the terminal memory; and if the data capacity of the cached resource of the first page is greater than the free storage capacity of the terminal memory, the cached resource of the first page is stored in the terminal memory after the terminal memory is cleaned.

More specifically, during a process where the terminal stores the cached resource of the first page in the terminal memory, the data capacity of the cached resource of the first page to be stored and the free storage capacity in the terminal memory may be first compared. If the data capacity of the cached resource of the first page is not greater than the free storage capacity in the terminal memory, the cached resource of the first page is directly stored in the terminal memory. If the data capacity of the cached resource of the first page is greater than the free storage capacity in the terminal memory, the cached resource of the first page is stored in the terminal memory after the terminal memory is cleaned.

Optionally, by determining the sizes of the data capacity of the cached resource of the first page and the free storage capacity in the terminal memory, the cached resource of the first page may be ensured to be accurately and effectively stored in the free storage space of the terminal memory. Further, under situations where the free storage space in the terminal memory is not sufficient to store the cached resource of the first page (i.e., the data capacity of the cached resource of the first page is greater than the free storage capacity of the terminal memory), the content in the terminal memory may be cleaned, such that the free storage capacity in the terminal memory may be sufficient enough to store the cached resource of the first page. Further, the cached resource of the first page is stored in the terminal memory to ensure that the cached resource of the first page may be accurately and effectively stored in the free storage space of the terminal memory. Further, by cleaning the terminal memory, the capacity that the terminal memory needs may be reduced, and the space utilization rate of the terminal memory may be improved.

In an optional embodiment, when the terminal memory is cleaned, an object with an earliest storage time may be selected for cleaning. Under situations where the data capacity of the cached resource of the first page is greater than the free storage capacity of the terminal memory, the cached resource of the page that is the earliest stored in the terminal memory may be deleted, thereby allowing the free storage capacity of the terminal memory to be greater than the cached resource of the first page. Accordingly, the cached resource of the first page may be entirely stored in the terminal memory.

As an optional embodiment, when the terminal memory is cleaned, an object that exceeds a preset period of time may be selected for cleaning. Under situations where the data capacity of the cached resource of the first page is greater than the free storage capacity of the terminal memory, the length of period from the time that the cached resource of each page is stored to the current time may be determined based on the time that the cached resource of each page is stored in the terminal memory. Further, the length of period of the cached resource of each page may be compared to the length of period preset in the terminal, and the cached resource of the page exceeding the preset length of period is deleted, thereby ensuring that the storage space in the terminal memory may be effectively utilized.

Optionally, after the terminal memory is cleaned, the data capacity of the cached resource of the first page and the free storage capacity of the terminal memory may be once again compared. If the data capacity of the cached resource of the first page is greater than the free storage capacity of the terminal memory, the process of terminal memory cleaning may need to be repeated until the occurrence of the situation where the data capacity of the cached resource of the first page is no longer greater than the free storage capacity of the terminal memory. Accordingly, the cached resource of the first page is stored in the terminal memory.

In an optional embodiment, the cached resource of the first page is stored in the terminal memory, and the cached resource of the first page is stored in a location of the terminal memory that is cleaned.

In another optional embodiment, the cached resource of the first page is stored in the terminal memory, and after the terminal memory is cleaned, the cached resource stored in the terminal memory may be sorted based on a precedence order of the storing time in locations of the terminal memory that is cleaned, and the cached resource of the first page needs to be stored is arranged in the end.

In an optional embodiment, the cached resource of the first page comprises: a focus location of the first page and dimension information of the first page. In particular, re-loading the first page based on the cached resource of the first page comprises: re-constructing the first page based on the dimension information and a current display frame, where the current display frame is determined based on the display interface of the terminal. Displaying the re-loaded first page on the terminal comprises: displaying content corresponding to the focus location of the first page on the terminal.

Optionally, the first page may be a large-scale page, and such first page may not be completely displayed on the terminal at one time. Accordingly, the terminal may each time only display partial content in the first page, and the displayed partial content is the display content. By sending an operation of moving (e.g., sliding) a display portion of the first page to the terminal, different portions of the first page may be displayed on the terminal, where the display portion displays the content corresponding to the focus location of the first page.

More specifically, the cached resource of the first page comprises a focus location of the first page and dimension information of the first page. In particular, the focus location of the first page indicates that during a process where the terminal last visits the first page, the location of such page is displayed at a terminal device based on a browsing need of a terminal user. The dimension information of the first page indicates that during a process where the terminal last visits the first page, the ratio of the first page that is displayed on the terminal. Accordingly, the terminal may perform a re-loading operation of the first page based on the cached resource of the first page, the display content of the first page when the terminal last visited the first page may be restored, and the re-displayed first page may be displayed based on the location and ratio of the last visit. Further, re-loading the first page based on the cached resource of the first page may refer to re-loading the first page based on the dimension information of the first page stored in the cached resource and the display frame determined by the display interface in the current terminal. Accordingly, the terminal may display the content of the first page corresponding to the focus location of the first page based on the display interface of the current terminal.

Optionally, the focus location of the first page is, under situations where the terminal last visited the first page, the location of the first page lastly displayed on the terminal display interface before the first page is switched. According to the focus location of the first page, the terminal may, under situations where the first page is re-displayed, display the content displayed by the terminal when last time the first page is left, such that a user of the terminal may continue to browse the content of the first page at the location where the page is previously left.

As an optional embodiment, the cached resource of the first page may include at least the following: a page display frame of the terminal, a page content of the first page, page layout information of the first page, frame view information of the first page, document content already loaded in the first page, and a focus location of the first page. In particular, the focus location represents the page browsing location when the first page is last visited via the terminal. Through the resource information in the aforementioned first page, the display content of the page when the first page is last left may be displayed at the display interface of the terminal, such that the user of the terminal may continue to browse the content before the first page is left.

Optionally, the page processing method in the aforementioned embodiments may be applied to a browser that uses an open-source page engine.

As an optional embodiment, the terminal of an Android browser based on the CrossWalk core may receive the first command configured to instruct and visit the first page, and the cached resource of the first page may be read from the terminal memory based on the first command. Accordingly, the terminal may re-load the first page based on the cached resource of the first page, and display the re-loaded first page on the terminal. In particular, CrossWalk is an open-source page engine.

It should be noted that, CrossWalk has a Chinese name of "人行橫道引擎" and is an open-source page engine that supports the Android mobile operating system. In particular, Android, with a Chinese name of "安卓", is an operating system applied to mobile devices.

Figure 2:
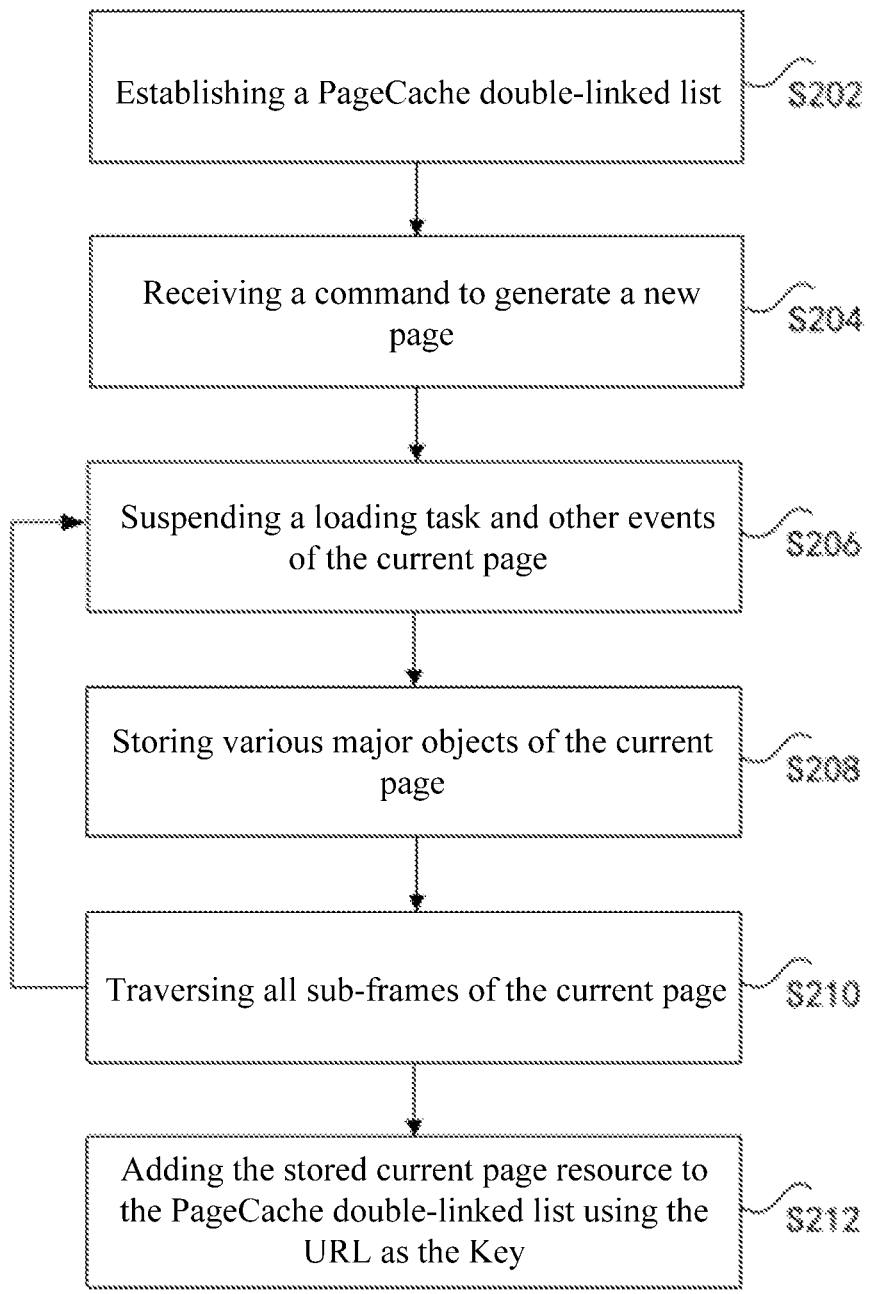
FIG. 2 illustrates a flow chart of an optional page resource storing method according to embodiments of the present disclosure.

FIG. 2 illustrates a flow chart of an optional page resource storing method according to embodiments of the present disclosure. As shown in FIG. 2, the method comprises the following steps:

Step S202: establishing a PageCache double-linked list.

By using the PageCache double-linked list as a terminal memory that stores the cached resource of the first page and using the unique URL of the first page as the Key of the linked list to store the cached resource of the first page in the PageCache double-linked list, the storing speed of the cached resource of the first page may be expedited, thereby facilitating the reading of the cached resource of the first page.

Step S204, receiving a command to generate a new page.

A user that uses the terminal sends a second command configured for switching to the terminal, and after the terminal receives the second command, displaying the first page is switched to displaying the second page.

Step S206, suspending a loading task and other events of the current page.

After receiving the second command sent by Step S204, the ongoing loading task and other ongoing events in the first page are suspended. For example, the page loading is suspended (i.e., the stop command of "stopAllLoaders( )"), the navigation is cancelled (i.e., the cancellation command of "navigationScheduler( ).cancel( )"), the document cache task is suspended (i.e., the Document task suspending command of "tasksWereSuspended( )", and the active object command is suspended (i.e., the Document active object suspending command of "suspendActiveDOMObjects( )"). Further, the loading task and other events are configured to be added to the symbol of the PageCache double-linked list (the command of adding PageCache symbol "setinPageCache(true)" is configured).

Step S208, storing various major objects of the current page.

After the loading task and other events of the current page are suspended, the cached resource of the first page is stored. For example, the display frame of the first page configured for page element recovery is stored (i.e., a "LocalFrame" object is stored) and the page content of the first page is stored (i.e., a "Document" object is stored). The page layout information of the first page configured for page view recovery is stored (i.e., a "LayoutView" object is stored), and frame view information of the first page is stored (i.e., a "FrameView" object is stored). Further, the loaded document content in the stored first page configured for page loading and user operation responding is stored (i.e., a "documentLoader" object is stored), and the focus location of the first page is stored (i.e., a "DomWindow" object is stored).

Step S210, traversing all sub-frames of the current page.

All sub-frames of the first page are traversed, and Step S206 and Step S208 are repeated until all the sub-frames are traversed, thereby caching all sub-frame pages in the first page.

Step S212, adding the stored current page resource to the PageCache double-linked list using the URL as the Key.

When the size of the PageCache linked list is not greater than a program preset value, the cached resource of the directly stored first page is added to the PageCache linked list. When the size of the PageCache linked list is greater than the program preset value, the earliest object in the linked list is invoked, and the memory is released, such that the size of the PageCache linked list is not greater than the program preset value, and the cached resource of the first page is added to the PageCache linked list.

Figure 3:
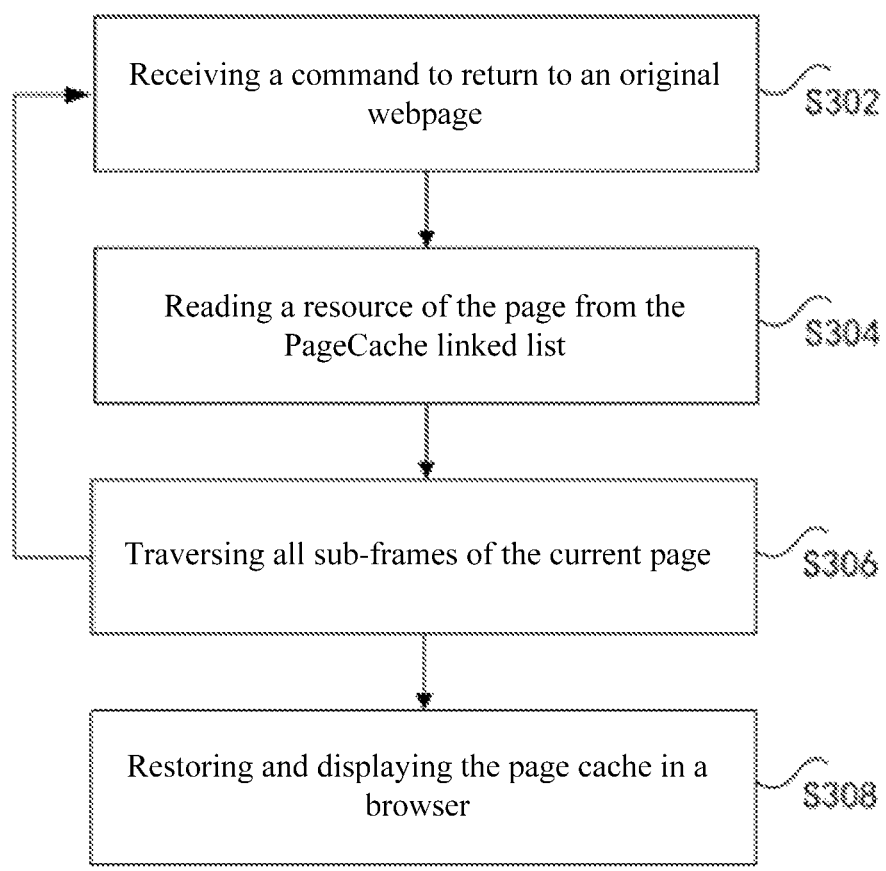
FIG. 3 illustrates a flow chart of an optional page resource reading method according to embodiments of the present disclosure.

FIG. 3 illustrates a flow chart of an optional page resource reading method according to embodiments of the present disclosure. As shown in FIG. 3, the method comprises the following steps:

Step S302, receiving a command to return to an original webpage.

The user that uses the terminal sends a first command configured for switching to the terminal, the terminal receives the first command, and displaying the second page is switched to displaying the first page.

It should be noted that, during a process where the terminal displays the first page, whether the cached resource of the first page exists in the PageCache linked list cached in steps of FIG. 2 is determined. If the cached resource of the first page exists, the cached resource of the first page corresponding to the URL is read from the PageCache linked list; and if the cached resource of the first page does not exist, the first page is re-loaded based on a normal page-loading process.

Step S304, reading a resource of the page from the PageCache linked list.

After receiving the first command sent by Step S301, the cached resource of the first page is read from the PageCache linked list, and the first page is re-loaded. The cached resource of the first page that is read comprises entire information of the first page. For example, the identifiers of the loading task and other events in the first page are read (a command of reading the PaeCache identifier "setinPageCache(false)" is configured), the size of the first page is read (i.e., an object of "setLayoutSize(intsize)" is read), and scaling of the first page is read (i.e., an object of "setPageScaleFactor( )" is read). The first page is configured in the current display frame of the terminal (i.e., an object of "LocalFrame" is read), and the view is configured (i.e., a command of "setView(view)" is executed). The focus location of the first page is read (i.e., an object of "DomWindow" is read) and configuration is performed (i.e., a command of "setDOMWindow( )" is executed). Further, the document cache task is stored (i.e., a command of suspending Document task "tasksWereSuspended( )" is stored), and an active object command is stored (i.e., a command of suspending Document active object "suspendActiveDOMObjects" is stored).

Step S306, traversing all sub-frames of the current page.

All sub-frames of the first page are traversed, and Step S301 is repeated till traversing of the sub-frames is fulfilled. All sub-frame pages in the first page stored in the PageCache linked list is re-loaded.

Step S308, the page cache restoring is fulfilled and displayed in a browser.

The re-loaded first page is displayed at a browser of the terminal.

Figure 4:
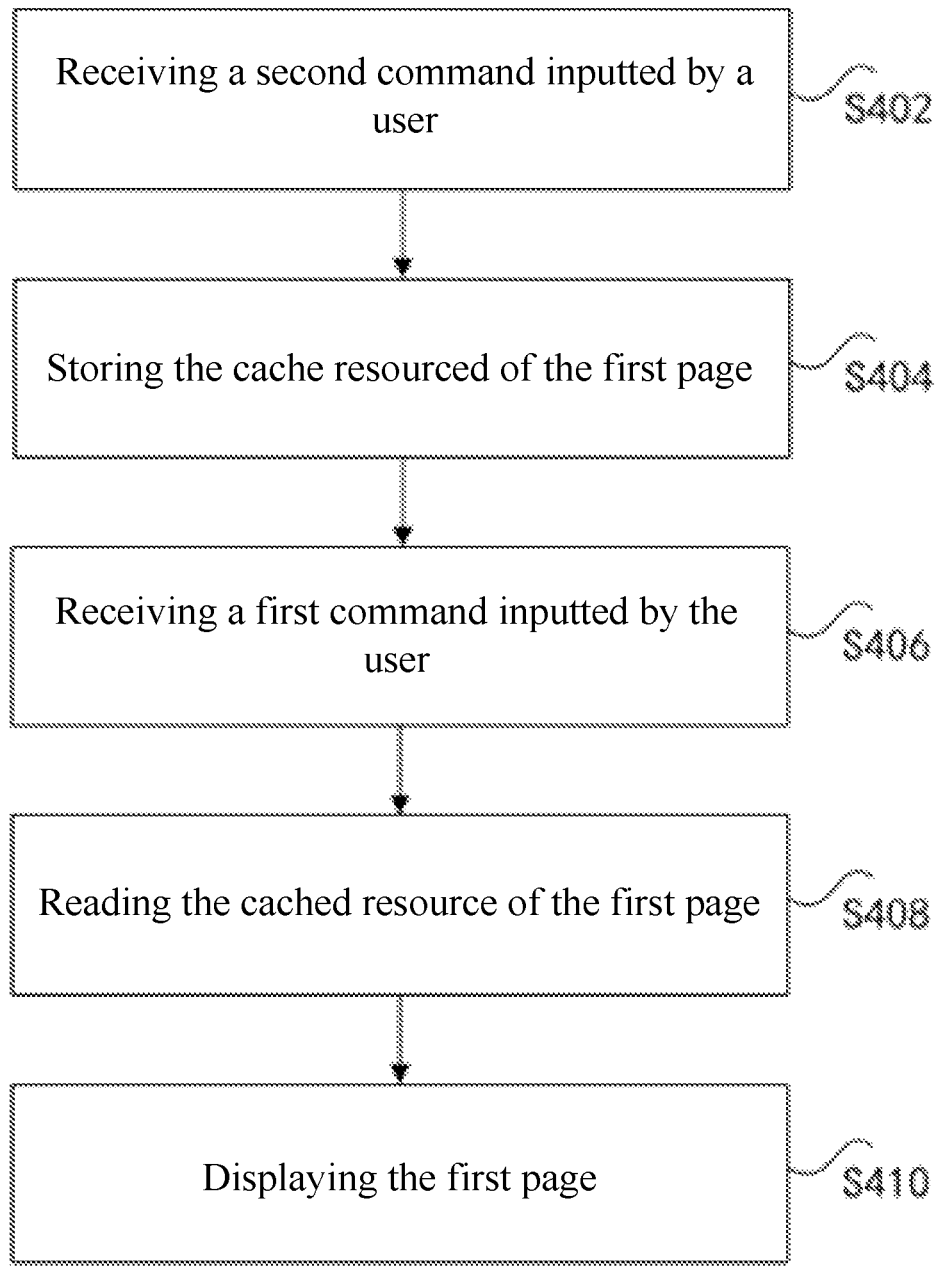
FIG. 4 illustrates a flow chart of an optional page processing method according to embodiments of the present disclosure.

FIG. 4 illustrates a flow chart of an optional page processing method according to embodiments of the present disclosure. As shown in FIG. 4, the method comprises the following steps:

Step S402, receiving a second command inputted by a user.

The user sends a second command to convert a first page to a second page, and the terminal receives the second command inputted by the user.

Step S404, storing the cached resource of the first page.

Before the user clicks the link of the first page to enter the second page, the cached resource of the first page including major page resources such as the document layout information of the first page (document tree), the page content of the first page (documentLoader), the frame view information of the first page (LocalFrame), and the focus location of the first page (domWindow) are stored in the linked list corresponding to the URL.

Step S406, receiving the first command inputted by the user.

The user sends out the first command that restores the second page to the first page, and the terminal receives the first command inputted by the user.

Step S408, reading the cached resource of the first page.

After the user clicks the backward button (i.e., after the user sends the first command that restores the second page to the first page), the terminal receives the first command inputted by the user and inquires corresponding data from the linked list via URL.

Step S410, displaying the first page.

The cached page resource is re-loaded and displayed at the CrossWalk interface.

In the aforementioned embodiments, by implementing the PageCache page cache mechanism and caching the major resource of the page, under situations where the user clicks a backward button, loading and resolving of the webpage from the network may be no longer needed, such that all resources of the webpage including the location information may be directly read from the cache. Thus, the data traffic consumption is saved, forward and backward operations may be realized rapidly, and the location of the page that the user leaves previously may be returned to, thereby facilitating the user to browse the page.

Figure 5:
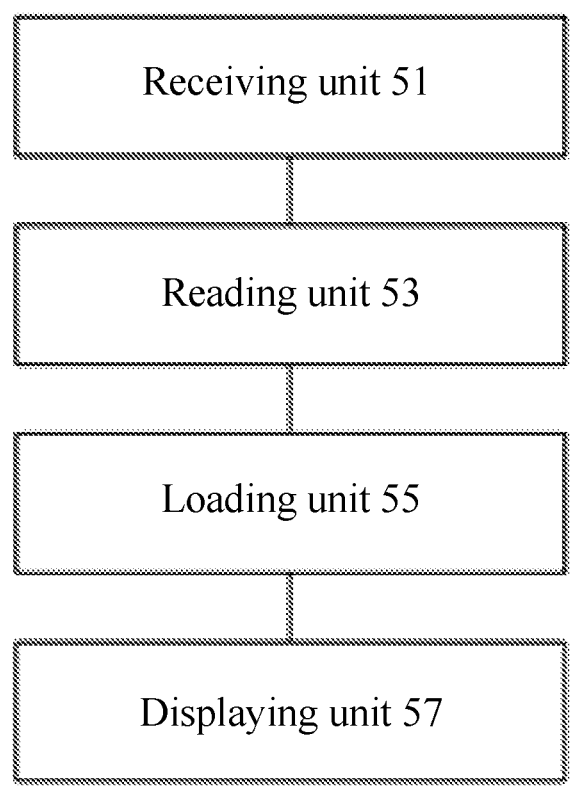
FIG. 5 illustrates a schematic view of a page processing device according to embodiments of the present disclosure.

FIG. 5 illustrates a schematic view of a page processing device according to embodiments of the present disclosure. As shown in FIG. 5, the device comprises: a receiving unit 51 configured to receive a first command, where the first command is configured to instruct and visit a first page, and the first page is a page that the terminal has already visited; a reading unit 53 configured to read the cached resource of the first page from the terminal memory; a loading unit 55 configured to re-load the first page based on the cached resource of the first page; and a displaying unit 57 configured to display the re-loaded first page on the terminal.

In the aforementioned embodiments, a terminal receives a first command via the receiving unit and re-visits a first page that the terminal has already visited under the instruction of the first command. In particular, after visiting the first page for a first time and under situations where the first page jumps to other pages, the terminal stores the cached resource of the first page in the terminal memory. Accordingly, when the terminal once again visits the first page, the terminal may directly read the cached resource of the first page from the terminal memory via the reading unit and re-load the first page based on the obtained cached resource of the first page via the loading unit. Further, the terminal may display the re-loaded first page on the terminal, such that under situations where the terminal receives a command configured to once again visit a page that the terminal has already visited, the webpage no longer needs to be loaded and resolved from the network again, and the entire cached resource of the webpage may be read directly from the terminal memory. Thus, not only the data traffic consumption is saved, but the re-visit of the already visited page is rapidly realized, thereby solving the technical issue of a low processing speed when a backward operation is executed in the page.

In an optional embodiment, before receiving the first command, the device further comprises: a first acquiring module configured to, after receiving a access request to visit the first page for a first time, acquire the cached resource of the first page from a server; a displaying module configured to perform loading and resolving operations on the cached resource of the first page, thereby displaying the first page on the terminal; a receiving module configured to, after displaying the first page on the terminal, receive a second command, where the second command is configured to instruct and visit a second page; a responding module configured to respond to the second command, and store the cached resource of the first page in the terminal memory.

In an optional embodiment, the responding module comprises: a second acquiring module configured to, after suspending a loading task of the first page, acquire the cached resource of the first page and a network resource address of the first page; a first storing module configured to store a correlation relationship between the cached resource of the first page and a network resource address of the first page in the terminal memory.

In an optional embodiment, the first command includes a forward command and a backward command. In particular, the forward command is configured to instruct the currently displayed page to be switched to a next page, and the next page is the first page. The backward command is configured to instruct the currently displayed page to be switched to a previous page, and the previous page is the first page.

As an optional embodiment, the reading unit comprises a reading module configured to read the cached resource of the first page corresponding to the network resource address of the first page from the terminal memory.

In an optional embodiment, the responding module comprises a comparing module configured to compare the data capacity of the cached resource of the first page and the free storage capacity of the terminal memory; a second storing module configured to, if the data capacity of the cached resource of the first page is not greater than the free storage capacity of the terminal memory, store the cached resource of the first page is directly in the terminal memory; a third storing module configured to, if the data capacity of the cached resource of the first page is greater than the free storage capacity of the terminal memory, store the cached resource of the first page in the terminal memory after the terminal memory is cleaned.

In an optional embodiment, the cached resource of the first page includes: a focus location of the first page and dimension information of the first page. In particular, a loading unit comprises: a constructing module configured to re-load the first page based on the dimension information and a currently displayed frame, where the currently displayed frame is determined based on a display interface of the terminal; and a displaying unit comprises: a displaying module configured to display content corresponding to the focus location of the first page on the terminal.

As an optional embodiment, the cached resource of the first page includes at least one of the following: a page display frame of the terminal, page content of the first page, page layout information of the first page, frame view information of the first page, document content already loaded in the first page, and a focus location of the first page, where the focus location represents a page browsing location when the first page is last visited via the terminal.

Optionally, the page processing device in the aforementioned embodiments is applied to a browser that uses an open-source page engine.

The series numbers of the aforementioned embodiments of the present disclosure are for descriptive purposes only, and do not represent the preference of embodiments.

In the aforementioned embodiments of the present disclosure, descriptions of each embodiment have their own emphasis, and a part not described in detail in a certain embodiment may refer to related descriptions of other embodiments.

In various embodiments of the present disclosure, it should be understood that the disclosed technical solutions may be implemented by other manners. In particular, the device embodiments described above are for illustrative purposes only. For example, the partition of the units may be a logic function partition. In practice, other partition manners may also be possible. For example, various units or components may be combined or integrated into another system, or some features may be omitted or left unexecuted. In addition, mutual coupling, direct coupling, or communication displayed or discussed herein may be indirect coupling or communication connection through some interfaces, units or modules, or may be in electrical or other forms.

Units described as separated components may or may not be physically separated, and the components serving as display units may or may not be physical units. That is, the components may be located at one position or may be distributed over various units. Some or all of the units may be selected to realize the purpose of solutions of embodiments herein according to practical needs.

Further, the various functional units of various embodiments of the invention may be integrated into one processing unit, or each unit may present individually. Two or more units may be integrated into one unit. The integrated unit may be realized in a hardware form, or in a form of software functional unit.

When the integrated unit is implemented in a form of software function unit and is sold or used as independent product, it may be stored in a computer accessible storage medium. Based on such understanding, the technical solutions of the present disclosure, or the portions contributing to the prior art may be embodied in the form of a software product. The computer software product may be stored in a storage medium, and include several instructions to instruct a computer device (e.g., a personal computer, a server, or a network device) to execute all or some of the method steps of each embodiment. The storage medium described above may include portable storage device, ROM (Read-Only Memory), RAM (Random Access Memory), a mobile HDD, a magnetic disc, an optical disc or any other media that may store program codes.

The aforementioned is only preferred embodiments of the present disclosure and is not configured to limit the present disclosure. Any modification, equivalent replacement, and improvement, etc. without departing from the spirit and principles of the present disclosure, shall all fall within the protection range of the present disclosure.

What is claimed is:

1. A page processing method, comprising:
receiving a first command, wherein the first command is configured to instruct and visit a first page at a second timepoint on a terminal, and the first page is a page previously visited at a first timepoint on the terminal, the second timepoint being later in time than the first timepoint;
displaying the first page on the terminal;
reading a cached resource of the first page from a terminal memory, the cached resource connecting the first page to a network resource address present at the first timepoint;

based on the cached resource of the first page, re-displaying at the second timepoint on the terminal the first page connected to the network resource address present at the first timepoint;

after displaying the first page on the terminal, receiving a second command configured to instruct to visit a second page;

suspending a loading task of an unloaded resource of the first page by a stop command;

cancelling a navigation of the first page by a cancellation command;

suspending a document cache task of the first page by a document task suspending command; and suspending an active object of the first page by an active object command.

2. The method according to claim 1, wherein before receiving the first command, the method further comprises:

after receiving an access request to visit the first page at the first timepoint, acquiring the cached resource of the first page from a server;

performing loading and resolving operations on the cached resource of the first page to display the first page on the terminal at the first timepoint; and in response to the second command, storing the cached resource of the first page in the terminal memory.

3. The method according to claim 2, wherein storing the cached resource of the first page in the terminal memory comprises:

after suspending the loading task of the first page, acquiring the cached resource of the first page and the network resource address of the first page; and storing a correlation relationship between the cached resource of the first page and the network resource address of the first page in the terminal memory.

4. The method according to claim 1, wherein:

the first command includes a forward command or a backward command, the forward command is configured to instruct a currently displayed page to be switched to a next page, wherein the next page is the first page, and the backward command is configured to instruct the currently displayed page to be switched to a previous page, wherein the previous page is the first page.

5. The method according to claim 1, wherein the cached resource of the first page includes: a focus location of the first page and dimension information of the first page, wherein:

re-displaying at the second timepoint the first page based on the cached resource of the first page comprises: re-displaying the first page based on the dimension information and a currently displayed frame, wherein the currently displayed frame is determined based on a display interface of the terminal; and displaying content corresponding to the focus location of the first page on the terminal.

6. The method according to claim 1, wherein the cached resource of the first page includes at least one of the following: a page display frame of the terminal, page content of the first page, page layout information of the first page, frame view information of the first page, document content that has already been loaded in the first page, and a focus location of the first page, wherein the focus location represents a page browsing location visited at the first timepoint via the terminal.

7. The method according to claim 1, wherein the method is applied to a browser that uses open-source page engine.

8. A page processing device, comprising a memory and a processor coupled to the memory, the processor being configured to:

receive a first command, wherein the first command is configured to instruct and visit a first page at a second timepoint on a terminal, and the first page is a page previously visited at a first timepoint on the terminal, the second timepoint being later in time than the first timepoint;

displaying the first page on the terminal;

read a cached resource of the first page from a terminal memory, the cached resource connecting the first page to a network resource address present at the first timepoint;

based on the cached resource of the first page, re-display at the second timepoint on the terminal the first page connected to the network resource address present at the first timepoint;

after displaying the first page on the terminal, receiving a second command, wherein the second command is configured to instruct to visit a second page;

suspending a loading task of an unloaded resource of the first page by a stop command;

cancelling a navigation of the first page by a cancellation command;

suspending a document cache task of the first page by a document task suspending command; and suspending an active object of the first page by an active object command.

9. The device according to claim 8, wherein before receiving the first command, the processor is further configured to:

after receiving an access request to visit the first page at the first timepoint, acquire the cached resource of the first page from a server;

perform loading and resolving operations on the cached resource of the first page to display the first page on the terminal at the first timepoint; and in response to the second command, store the cached resource of the first page in the terminal memory.

10. The device according to claim 9, wherein the processor is further configured to:

after suspending the loading task of the first page, acquire the cached resource of the first page and the network resource address of the first page; and store a correlation relationship between the cached resource of the first page and the network resource address of the first page in the terminal memory.

11. The device according to claim 8, wherein:

the first command includes a forward command or a backward command, the forward command is configured to instruct and switch a currently displayed page to a next page, wherein the next page is the first page, and the backward command is configured to instruct the currently displayed page to be switched to a previous page, wherein the previous page is the first page.

12. The device according to claim 8, wherein the cached resource of the first page comprises a focus location of the first page and dimension information of the first page, wherein the processor is further configured to:

re-display at the second timepoint the first page based on the dimension information and a currently displayed frame, wherein the currently displayed frame is determined based on a display interface of the terminal; and display content corresponding to the focus location of the first page on the terminal.

13. The device according to claim 8, wherein the cached resource of the first page includes at least one of the following: a page display frame of the terminal, page content of the first page, page layout information of the first page, frame view information of the first page, document content that has already been loaded in the first page, and a focus location of the first page, wherein the focus location represents a page browsing location visited at the first timepoint via the terminal.

14. The device according to claim 8, wherein the device is applied to a browser that uses an open-source page engine.

* * * * *